May 31, 1932.  J. A. ADELL  1,861,074
JUNCTION BOX
Original Filed March 3, 1928
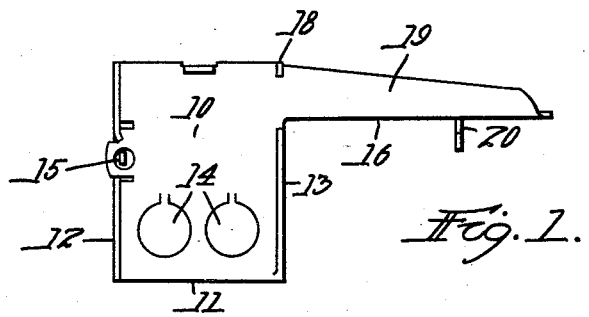
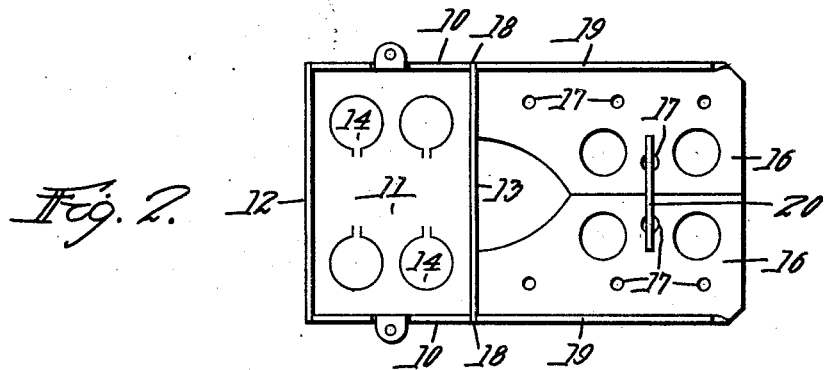
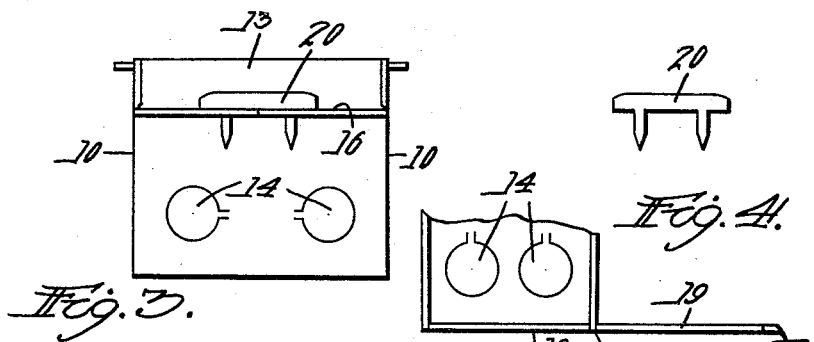
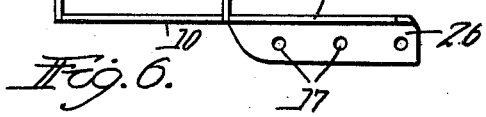
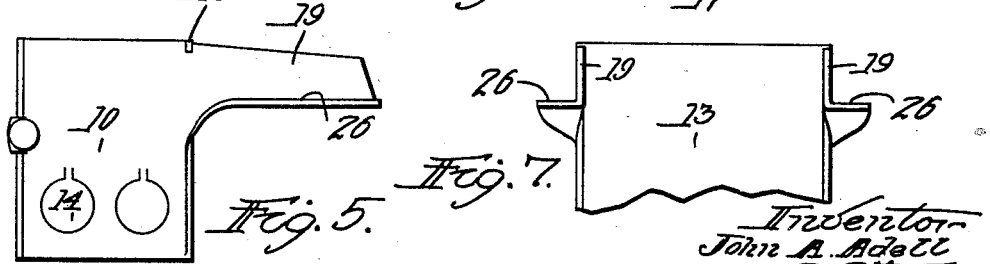
Inventor
John A. Adell
By Attorneys
Southgate Fay + Hawley Patented May 31, 1932

1,861,074

UNITED STATES PATENT OFFICE

JOHN A. ADELL, OF ORANGE, MASSACHUSETTS

JUNCTION BOX

Application filed March 3, 1928, Serial No. 258,934. Renewed September 28, 1931.

This invention relates to a junction box for making electrical connections.

The principal objects of the invention are to provide a box of sectional nature and of the usual construction as far as the interior elements of the box itself are concerned, but with a substantially continuous plate for supporting the box in any desired position on the wall or wooden studding; to provide for constructing the box in a comparatively inexpensive manner, so that it can be placed at any desired distance from its support to make it suitable for any desired thickness of wall, and to provide a simple fastening device therefor to hold the two parts of the supporting plate together and to secure it to the wall or studding.

Other objects and advantages of the invention will appear hereinafter.

Reference is to be had to the accompanying drawings, in which

Fig. 1 is an end view of a junction or outlet box constructed in accordance with a preferred embodiment of this invention;

Fig. 2 is a plan of the same;

Fig. 3 is a side view;

Fig. 4 is a view of the fastening device; and

Figs. 5, 6 and 7 are corresponding views of a modification.

In the form shown in Figs. 1, 2 and 3, the box is formed with the usual ends 10, bottom 11 and one side wall 12. Practically the entire invention lies in the construction of the other side wall 13 and associated parts as will appear. The parts 10, 11 and 13 are integral with each other, being formed in one piece bent to the desired shape. The side wall 12 is fixed to the ends as by fastenings 15 or in any usual manner. They form a box of the desired shape and kind, and the walls are provided with the removable discs 14 at any desired points.

The principal feature of this invention is the provision of horizontal plates 16 at the two ends of the box adapted to rest on a wooden support and to be secured thereto by nails through holes 17. Wherever supports of this kind have been employed heretofore, they have been made in separate pieces which have to be bolted to the end walls. This consumed considerable time.

According to this invention I make the end walls 10 each with a vertical wall 19 and a horizontal plate 16 integral therewith all from one piece of sheet stock. For this purpose all that is necessary is to cut out a blank of the necessary dimensions.

This blank is cut out in this form with slits at the edges of the walls 10. These plates are then bent upwardly at right angles and made rights and lefts. When the end walls are bent up from the bottom these two plates 16 naturally come into the same plane. They are made of a width equal to half the length of the completed box so that their inner edges touch. Thus they form a practically continuous plate. The side wall 13 has projections 18 fitting in slots at the tops of the end walls 11 to hold them firmly together. The holes 17 are punched and the two plates 16 project horizontally from the wall 13 which is in vertical position as usual.

The two plates 16 are secured together by driving a U-shaped staple 20 through a hole 17 in each. The legs of this staple bind against the sides of the two holes and clamp the two plates together. They also are driven into the wood to hold the device, as a whole, in place.

This constitutes a very simple and inexpensive method of making these supporting plates and securing the two plates together and the entire device in place. There are no parts projecting beyond the end walls. The cost of production and installation together is very materially reduced.

In the form shown in Figs. 5, 6 and 7, the parts are all the same except that the plates 16 are not used, but the vertical walls 19 extend as in the other figures, in the planes of the end walls. An arm or flange 26 is bent outwardly from each one and provided with holes 17 for nailing. This is still simpler and less expensive.

Although I have illustrated and described only two forms of the invention, I am aware of the fact that other modifications can be made therein by any person skilled in the art without departing from the scope of the invention as expressed in the claims. Therefore I do not wish to be limited in these respects, but what I do claim is:—

1. As an article of manufacture, a junction or outlet box having one side, both ends and bottom pieces integral, said side wall having integral plates projecting therefrom to one side and meeting with their lower surfaces in a plane for attachment to a supporting element.

2. As an article of manufacture, an outlet or junction box having one of its sides provided with two integral plates in one plane and extending from its opposite upper corners laterally, and meeting for the purpose described.

3. As an article of manufacture, a junction or outlet box having sheet metal ends provided with two projecting walls in their own planes and two integral plates extending from the walls, said plates being in the same plane, in contact and at right angles to said walls.

4. As an article of manufacture, a junction or outlet box having its side, end and bottom integral, one side wall having integral walls projecting therefrom at its ends and in the planes of the two ends of the box, and having plates integral with one of said walls at right angles thereto on the inner sides of said walls and in a plane for attachment to a supporting element, said plates having perforations therethrough by which they can be nailed to a support, and means passing through two perforations, one in each plate, for securing the plates together and securing the whole structure to a wooden support.

5. As an article of manufacture, a junction or outlet box having its side, end and bottom integral, one side having integral arms projecting therefrom with their lower surfaces in a single plane for attachment to a supporting element, and walls extending from the inner edges of said arms in the planes of the ends of the box.

In testimony whereof I have hereunto affixed my signature.

JOHN A. ADELL.